US012590014B1

(12) United States Patent
Xu et al.

(10) Patent No.: US 12,590,014 B1
(45) Date of Patent: Mar. 31, 2026

(54) METHOD FOR IMPROVING PARTICLE SIZE AND MORPHOLOGY OF NEUTRALIZER FOR LATERITE NICKEL ORE HYDROMETALLURGY

(71) Applicants: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

(72) Inventors: Kaihua Xu, Shenzhen (CN); Satryo Soemantri Brodjonegoro, Jakarta (ID); Tegar Mukti Aji, Jakarta (ID); Rizky Wanaldi, Jakarta (ID); Andi Syaputra Hasibuan, Jakarta (ID); Piyan Rahmadi, Jakarta (ID); Ulfi Rohmawati, Jakarta (ID); Wenze Liu, Jakarta (ID)

(73) Assignees: PT QMB NEW ENERGY MATERIALS, Jakarta (ID); PT ESG NEW ENERGY MATERIAL, Jakarta (ID); GEM CO., LTD., Shenzhen (CN); PT GEM INDONESIA NEW ENERGY MATERIALS, Jakarta (ID)

( * ) Notice: Subject to any disclaimer, the term of this patent is extended or adjusted under 35 U.S.C. 154(b) by 21 days.

(21) Appl. No.: 18/870,504

(22) PCT Filed: Jul. 3, 2023

(86) PCT No.: PCT/CN2023/105483

§ 371 (c)(1),
(2) Date: Nov. 29, 2024

(87) PCT Pub. No.: WO2025/007235

PCT Pub. Date: Jan. 9, 2025

(51) Int. Cl.

| | |
|---|---|
| *C01G 53/84* | (2025.01) |
| *C22B 3/04* | (2006.01) |
| *C22B 3/22* | (2006.01) |
| *C22B 21/00* | (2006.01) |

(52) U.S. Cl.
CPC .............. *C01G 53/84* (2025.01); *C22B 3/04* (2013.01); *C22B 3/22* (2013.01); *C22B 21/0015* (2013.01)

(58) Field of Classification Search
None
See application file for complete search history.

(56) References Cited

FOREIGN PATENT DOCUMENTS

| | | | | |
|---|---|---|---|---|
| CN | 110629022 A | * | 12/2019 | ............. C22B 3/065 |
| CN | 111621641 A | | 9/2020 | |
| WO | WO-2019174103 A1 | * | 9/2019 | ......... C22B 23/0461 |

OTHER PUBLICATIONS

Claims of PCT/CN2023/105483.
CNIPA (ISA), Written opinion for PCT/CN2023/105483, Nov. 21, 2023.

* cited by examiner

*Primary Examiner* — Tanisha Diggs
(74) *Attorney, Agent, or Firm* — Hemisphere Law, PLLC

(57) ABSTRACT

A method for improving the particle size and morphology of a neutralizing agent used in the laterite nickel ore hydrometallurgy, in a process flow for producing nickel-cobalt-manganese hydroxide by the laterite nickel ore hydrometallurgy, a nickel-cobalt-manganese-containing feed liquid is subjected to one-stage iron-aluminum removal treatment and two-stage iron-aluminum removal treatment by using a neutralizing agent successively, wherein the −200 mesh sieving rate by mass ratio of the neutralizing agent is 85%-90%, and the spherical coefficient of solid particles of the neutralizing agent is not less than 0.6. In the disclosure, the particle size and morphology of the neutralizing agent are respectively improved so as to be used in the steps of one-stage iron-aluminum removal treatment and two-stage iron-aluminum removal treatment. The iron-aluminum removal rates in the steps of one-stage iron-aluminum removal treatment and two-stage iron-aluminum removal treatment can be effectively increased, and at the same time, the surface roughness of the solid particles of the neutralizing agent can be ensured to be lower, thereby reducing the rates of nickel, cobalt, and manganese ions reacting with local alkali to generate precipitations, thereby reducing the loss of nickel, cobalt, and manganese and further improving the yield of nickel-cobalt-manganese hydroxide produced by the laterite nickel ore hydrometallurgy.

10 Claims, 2 Drawing Sheets

Calcium sulfate

METHOD FOR IMPROVING PARTICLE SIZE AND MORPHOLOGY OF NEUTRALIZER FOR LATERITE NICKEL ORE HYDROMETALLURGY

FIELD OF THE DISCLOSURE

The disclosure relates to the technical field of nickel-cobalt-manganese material production, and in particular to a method for improving the particle size and morphology of the neutralizer for laterite nickel ore hydrometallurgy.

BACKGROUND

With the rapid development of the battery industry, the world's demand for nickel-cobalt-manganese rises sharply, and the price of nickel-cobalt-manganese rises greatly. High-grade nickel-cobalt-manganese resources become increasingly exhausted, and people focus on the development of low-grade laterite nickel ore with complex composition. The process used is usually a high-pressure acid-leaching process to produce nickel-cobalt-manganese raw materials for ternary power batteries.

At present, limestone powder is usually used as the neutralizer in the iron-aluminum removal process of laterite nickel ore. In order to realize the neutralization process, the common grinding control of limestone particle size is only controlled by the passing rate through a 200-mesh sieve. However, the particle size control method of the limestone powder is relatively single, which will form a large amount of over-ground fine particles and a small amount of coarse particles. The gradation of limestone powder prepared by this particle size control method is uncertain, and it is greatly affected by the moisture content of raw materials, the origin of raw materials, the particle size of raw materials, and the hardness of raw materials. The addition of this limestone powder to laterite nickel ore hydrometallurgy for iron-aluminum removal has two disadvantages due to the small spherical coefficient: (1) a large number of fine particles (also referred to as over-ground particles) in the powder have a large surface area, react rapidly in the solution and easily form local over-alkali, and a large number of nickel-cobalt-manganese ions are precipitated locally, resulting in the loss of nickel-cobalt-manganese; (2) a small amount of large-particle stone (also referred to as hard-to-grind particles) which is not finely ground in the powder cannot be sufficiently reacted; the reaction time is long, so that the pH value required for rapid and accurate control of iron-aluminum removal cannot be achieved, resulting in an undesirable iron-aluminum removal rate, and large-particle $CaSO_4$ crystals (with a particle size of greater than 50 um) may also form in the iron aluminum slag, as shown in FIG. 1. In addition, the morphology of neutralizer particles can also affect the reaction rate. Data shows that neutralizer particles with low spherical coefficients have rough surfaces, poor flow ability, and are more prone to aggregation in solution, leading to local over-alkali problems.

Therefore, there is a need for a method for improving the particle size and morphology of the neutralizer for laterite nickel ore hydrometallurgy to solve the above technical problems.

SUMMARY

It is an object of the disclosure to provide a method for improving the particle size and morphology of the neutralizer for laterite nickel ore hydrometallurgy for improving the technical problems of the existing processes for the hydrometallurgical to produce nickel-cobalt-manganese hydroxides in which the rate of the iron-aluminum removal is too low and the rate of nickel-cobalt-manganese metal loss is too high.

In order to solve the above technical problem, the disclosure provides a method for improving the particle size and morphology of a neutralizer for laterite nickel ore hydrometallurgy, in a process flow for producing nickel-cobalt-manganese hydroxide by the laterite nickel ore hydrometallurgy, a nickel-cobalt-manganese-containing feed liquid is subjected to one-stage iron-aluminum removal treatment and two-stage iron-aluminum removal treatment by using a neutralizer successively;

wherein the passing rate through a 200-mesh sieve of the neutralizer is 85%-90%, and the spherical coefficient of solid particles of the neutralizer is not less than 0.6.

In the method for improving the particle size and morphology of the neutralizer for laterite nickel ore hydrometallurgy provided by the disclosure, in the process flow for producing nickel-cobalt-manganese hydroxide by the laterite nickel ore hydrometallurgy, the nickel-cobalt-manganese-containing feed liquid is subjected to the one-stage iron-aluminum removal treatment by using the neutralizer, and a one-stage iron-aluminum-containing residue and a one-stage iron-aluminum removal liquid are obtained after solid-liquid separation; the one-stage iron-aluminum removal liquid is subjected to a two-stage iron-aluminum removal treatment by using the neutralizer, and a two-stage iron-aluminum-containing residue and a two-stage iron-aluminum removal liquid are obtained after solid-liquid separation.

In the method for improving the particle size and morphology of the neutralizer for laterite nickel ore hydrometallurgy provided by the disclosure, the material of the neutralizer is selected from at least one of limestone, lime milk, magnesite pulp, magnesia pulp, magnesium ore in laterite nickel ores, magnesium oxide, and sodium hydroxide.

In the method for improving the particle size and morphology of the neutralizer for laterite nickel ore hydrometallurgy provided by the disclosure, the neutralizer is prepared from a raw ore material by a one-stage grinding treatment and a two-stage grinding treatment, respectively, wherein the one-stage grinding treatment adopts a vertical mill to grind the raw ore material so as to obtain a first powder, and the two-stage grinding treatment adopts a ball mill to grind and shape the first powder so as to obtain a second powder;

wherein the spherical coefficient of the second powder is greater than the spherical coefficient of the first powder.

Preferably, in the method for improving the particle size and morphology of the neutralizer for laterite nickel ore hydrometallurgy provided by the disclosure, the passing rate through a 200-mesh sieve of the raw ore material after the one-stage grinding treatment is 75% and the passing rate through a 200-mesh sieve of the raw ore material after the two-stage grinding treatment is 88%.

In the method for improving the particle size and morphology of the neutralizer for laterite nickel ore hydrometallurgy provided by the disclosure, the particle size density distribution pattern of the solid particles of the neutralizer is a bimodal distribution pattern; among them, the particle size density distribution of the solid particles in the particle size range of 1 um to 10 um accounts for 2.5% to 4.5%; and the particle size density distribution of the solid particles in the particle size range of 10 um to 20 um accounts for 2.5% to 2.8%.

In the method for improving the particle size and morphology of the neutralizer for laterite nickel ore hydrometallurgy provided by the disclosure, the pH value of the one-stage iron-aluminum removal liquid is in a range of 3 to 4.2, and the pH value of the two-stage iron-aluminum removal liquid is in a range of 4.5 to 5.5.

In the method for improving the particle size and morphology of the neutralizer for laterite nickel ore hydrometallurgy provided by the disclosure, the iron removal rate in the one-stage iron-aluminum removal treatment process is greater than 88.46%; the aluminum removal rate in the one-stage iron-aluminum removal treatment process is greater than 93.03%; the nickel precipitation rate in the one-stage iron-aluminum removal treatment process is less than 4.36%, the cobalt precipitation rate in the one-stage iron-aluminum removal treatment process is less than 4.47%; and the manganese precipitation rate in the one-stage iron-aluminum removal treatment process is less than 5.74%.

In the method for improving the particle size and morphology of the neutralizer for laterite nickel ore hydrometallurgy provided by the disclosure, the iron removal rate in the two-stage iron-aluminum removal treatment process is greater than 51.95%; the aluminum removal rate in the two-stage iron-aluminum removal treatment process is greater than 99.03%; the nickel precipitation rate in the two-stage iron-aluminum removal treatment process is less than 17.20%, the cobalt precipitation rate in the two-stage iron-aluminum removal treatment process is less than 10.94%; and the manganese precipitation rate in the two-stage iron-aluminum removal treatment process is less than 10.20%.

In the method for improving the particle size and morphology of the neutralizer for laterite nickel ore hydrometallurgy provided by the disclosure, before the step of subjecting the nickel-cobalt-manganese-containing feed liquid to the one-stage iron-aluminum removal treatment step using the neutralizer, it further comprises:

subjecting the laterite nickel ore to an acid-leaching treatment to obtain a leached ore pulp;

subjecting the leached ore pulp to cycle leaching and pre-neutralization treatment to obtain a pre-neutralized slurry; and subjecting the pre-neutralized slurry to counter-current washing, and solid-liquid separation to obtain a leaching tailing and the nickel-cobalt-manganese-containing feed liquid.

The beneficial effect of the disclosure is that differing from the prior art, the disclosure provides a method for improving the particle size and morphology of a neutralizer used in the laterite nickel ore hydrometallurgy, in a process flow for producing nickel-cobalt-manganese hydroxide by the laterite nickel ore hydrometallurgy, a nickel-cobalt-manganese-containing feed liquid is subjected to a one-stage iron-aluminum removal treatment and two-stage iron-aluminum removal treatment by using a neutralizer successively, wherein the passing rate through a 200-mesh sieve of the neutralizer is 85%-90%, and the spherical coefficient of solid particles of the neutralizer is not less than 0.6. In the method for improving the particle size and morphology of a neutralizer used in the laterite nickel ore hydrometallurgy provided by the disclosure, the particle size and morphology of the neutralizer are respectively adjusted so as to be used in the steps of one-stage iron-aluminum removal treatment and two-stage iron-aluminum removal treatment sequentially. The passing rate through a 200-mesh sieve of the neutralizer is 85%-90%, ensuring relatively fine solid particles, thereby effectively increasing the iron-aluminum removal rates in the steps of one-stage iron-aluminum removal treatment and two-stage iron-aluminum removal treatment. At the same time, the spherical coefficient of solid particles of the neutralizer is not less than 0.6, ensuring a lower surface roughness of the solid particles of the neutralizer, thereby reducing the rates of nickel, cobalt, and manganese ions reacting with local alkali to generate precipitations, thereby reducing the loss of nickel, cobalt, and manganese and further improving the yield of nickel-cobalt-manganese hydroxide produced by the laterite nickel ore hydrometallurgy.

DETAILED DESCRIPTION OF PREFERRED EMBODIMENTS

Figure 1:
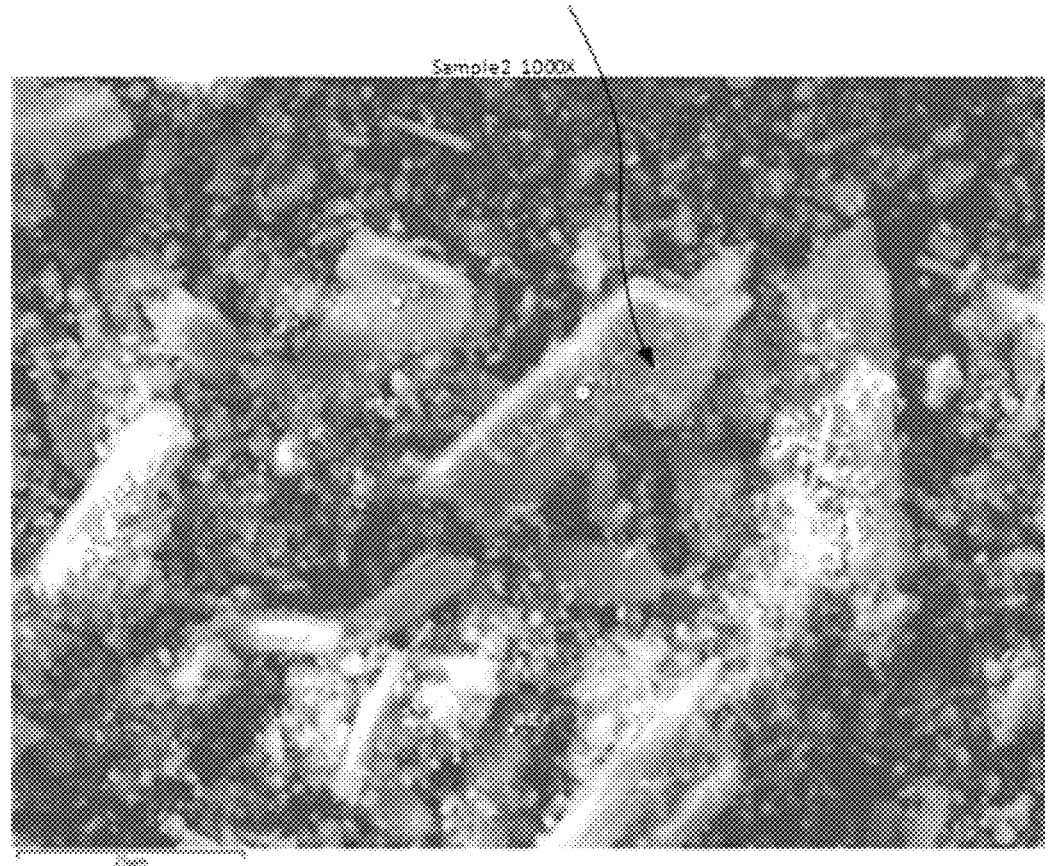
FIG. 1 is a schematic diagram of an X-ray energy spectrum layering image of iron aluminum slag in the prior art using the method for improving the particle size and morphology of the neutralizer for laterite nickel ore hydrometallurgy.

The technical solutions in the embodiments of the disclosure will be described clearly and completely in conjunction with the embodiments of the disclosure. Obviously, the described embodiments are only a part of the embodiments of the disclosure, rather than all the embodiments. Based on the embodiments of the disclosure, all Other embodiments obtained by a person of ordinary skill in the art without inventive effort fall within the scope of the disclosure.

The disclosure provides a method for improving the particle size and morphology of the neutralizer for laterite nickel ore hydrometallurgy. In the process flow for producing nickel-cobalt-manganese hydroxide by the laterite nickel ore hydrometallurgy, the nickel-cobalt-manganese-containing feed liquid is subjected to the one-stage iron-aluminum removal treatment by using the neutralizer, and a one-stage iron-aluminum-containing residue and a one-stage iron-aluminum removal liquid are obtained after solid-liquid separation;

wherein the passing rate through a 200-mesh sieve of the neutralizer is 85%-90%, and the spherical coefficient of solid particles of the neutralizer is not less than 0.6.

Specifically, before the step of subjecting the nickel-cobalt-manganese-containing feed liquid to the one-stage iron-aluminum removal treatment step using the neutralizer, it further comprises:

subjecting the laterite nickel ore to an acid-leaching treatment to obtain a leached ore pulp;

subjecting the leached ore pulp to cycle leaching and pre-neutralization treatment to obtain a pre-neutralized slurry; and subjecting the pre-neutralized slurry to counter-current washing by using CCD washing, and solid-liquid separation to obtain a leaching tailing and the nickel-cobalt-manganese-containing feed liquid;

wherein, the number of CCD washing stages is from 4 to 7, and the washing ratio is from 2 to 7.

Further, the laterite nickel ore is a limonite-type laterite nickel ore, a residual ore-type laterite nickel ore, or a mixture of two minerals. The leaching temperature is 80° C. to 300° C.; the leaching time is 0.5 h to 5 h; and the terminal acidity value is controlled at 15 g/to 65 g/L.

Further, the material of the neutralizer used in the pre-neutralization treatment is at least one selected from limestone, lime milk, magnesite pulp, magnesia pulp, magnesium ore in laterite nickel ores, magnesium oxide, and sodium hydroxide. The pH value at the endpoint is controlled at 1.0-2.0; and sodium sulfate is also added in the pre-neutralization treatment to provide sodium ions to remove ferric iron.

In the examples of the disclosure, the solid particles of the neutralizer used in the pre-neutralization treatment have a spherical coefficient of not less than 0.6; wherein the neutralizer is prepared from a raw ore material by a one-stage grinding treatment and a two-stage grinding treatment, respectively, wherein the one-stage grinding treatment adopts a vertical mill to grind the raw ore material so as to obtain a first powder, and the two-stage grinding treatment adopts a ball mill to grind and shape the first powder so as to obtain a second powder.

Specifically, the spherical coefficient of the second powder is greater than the spherical coefficient of the first powder, and the raw ore material may be limestone ore.

In another embodiment of the disclosure, the neutralizer employed in the pre-neutralization treatment may employ a conventional neutralizer with a spherical coefficient; this is due to the fact that the pH in the pre-neutralized slurry is too low and local over-alkali is less likely to occur.

In the embodiments of the disclosure, the nickel-cobalt-manganese-containing feed liquid is subjected to a one-stage iron-aluminum removal treatment by using a neutralizer, and a one-stage iron-aluminum-containing residue and a one-stage iron-aluminum removal liquid are obtained after solid-liquid separation;

wherein the spherical coefficient of the solid particles of the neutralizer selected for the one-stage iron-aluminum removal treatment on the nickel-cobalt-manganese-containing feed liquid is not less than 0.6, wherein the neutralizer is prepared from a raw ore material by a one-stage grinding treatment and a two-stage grinding treatment, respectively, wherein the one-stage grinding treatment adopts a vertical mill to grind the raw ore material so as to obtain a first powder, and the two-stage grinding treatment adopts a ball mill to grind and shape the first powder so as to obtain a second powder.

Specifically, the spherical coefficient of the second powder is greater than the spherical coefficient of the first powder, and the raw ore material may be limestone ore.

Further, the pH of the one-stage iron-aluminum removal liquid ranges from 3 to 4.2.

In an embodiment of the disclosure, in the process flow for producing nickel-cobalt-manganese hydroxide by the laterite nickel ore hydrometallurgy, the one-stage iron-aluminum removal liquid is subjected to a two-stage iron-aluminum removal treatment by using the neutralizer, and a two-stage iron-aluminum-containing residue and a two-stage iron-aluminum removal liquid are obtained after solid-liquid separation.

Specifically, the material of the neutralizer is selected from at least one of limestone, lime milk, magnesite pulp, magnesia pulp, magnesium ore in laterite nickel ores, magnesium oxide, and sodium hydroxide.

Specifically, the neutralizer is prepared from a raw ore material by a one-stage grinding treatment and a two-stage grinding treatment, respectively, wherein the one-stage grinding treatment adopts a vertical mill to grind the raw ore material so as to obtain a first powder, and the two-stage grinding treatment adopts a ball mill to grind and shape the first powder so as to obtain a second powder.

Specifically, the spherical coefficient of the second powder is greater than the spherical coefficient of the first powder, and the raw ore material may be limestone ore.

Specifically, the pH of the two-stage iron-aluminum removal liquid ranges from 4.5 to 5.5.

In an embodiment of the disclosure, the two-stage iron-aluminum removal liquid are respectively subjected to a deep impurity removal treatment and at least one stage nickel-cobalt-manganese precipitation treatment, and a nickel-cobalt-manganese hydroxide product is obtained after solid-liquid separation.

Wherein the neutralizer used in the deep impurity removal treatment process is at least one selected from limestone, lime milk, magnesite pulp, magnesia pulp, magnesium ore in laterite nickel ores, magnesium oxide, and sodium hydroxide; and the pH at the endpoint is controlled to be 5.6-6.0. The underflow after the deep impurity removal is returned to be mixed with the leached ore pulp for reaction. Iron ions and aluminum ions are removed in the deep impurity removal.

In the embodiments of the disclosure, the experimental results of a one-stage iron-aluminum removal treatment on a nickel-cobalt-manganese-containing feed liquid using neutralizers of different particle sizes (the neutralizers were prepared using a vertical mill alone, and the particle size was in an unimodal pattern) are shown in Table 1 below (experimental conditions: the neutralizer was selected from calcium carbonate; the temperature during the one-stage iron-aluminum removal process was 60° C.; and the pH at the endpoint of the one-stage iron-aluminum removal liquid was 4):

TABLE 1

| Passing rate through a 200-mesh sieve neutralizer % | Iron removal rate % | Aluminum removal rate % | Nickel precipitation rate % | Cobalt precipitation rate % | Manganese precipitation rate % |
|---|---|---|---|---|---|
| 70 | 86.32 | 93.20 | 4.02 | 3.95 | 4.71 |
| 75 | 88.17 | 93.97 | 4.18 | 3.97 | 5.02 |
| 80 | 87.69 | 92.64 | 4.34 | 4.11 | 5.36 |
| 85 | 88.46 | 93.03 | 4.36 | 4.47 | 5.74 |
| 90 | 88.61 | 93.18 | 5.14 | 5.13 | 6.64 |
| 95 | 88.27 | 92.44 | 6.35 | 5.60 | 6.77 |

It can be seen from Table 1 that, in a one-stage iron-aluminum removal process, as the smaller the calcium carbonate fineness, the metal (nickel-cobalt-manganese) loss rate slowly increases at first, and then increases more at 90%, and the effect of iron-aluminum removal has little effect. Therefore, in the one-stage iron-aluminum removal process, the best point of the neutralizer for calcium carbonate fineness is 85% in the passing rate through a 200-mesh sieve.

Specifically, the experimental results of a two-stage iron-aluminum removal treatment on one-stage iron-aluminum removal liquid using neutralizers with different particle sizes (the neutralizers were separately prepared using a vertical mill, and the particle size was an unimodal pattern) are shown in Table 2: (experimental conditions: the neutralizer was selected from calcium carbonate; the temperature during the two-stage iron-aluminum removal process was 60° C.; and the pH at the endpoint of the two-stage iron-aluminum removal liquid was 5)

TABLE 2

| Passing rate through a 200-mesh sieve of neutralizer, % | Iron removal rate % | Aluminum removal rate % | Nickel precipitation rate % | Cobalt precipitation rate % | Manganese precipitation rate % |
|---|---|---|---|---|---|
| 70 | 41.37 | 97.32 | 16.85 | 10.46 | 9.56 |
| 75 | 44.92 | 98.06 | 17.18 | 11.02 | 9.92 |
| 80 | 48.03 | 98.74 | 17.25 | 11.10 | 9.89 |
| 85 | 51.95 | 99.03 | 17.20 | 10.94 | 10.02 |
| 90 | 58.33 | 99.06 | 17.22 | 11.03 | 9.97 |
| 95 | 48.61 | 96.95 | 20.01 | 12.09 | 9.99 |

It can be seen from Table 2 that in the two-stage iron-aluminum removal, as the smaller the particle size of calcium carbonate, the iron removal rate increases first and then decreases, and the aluminum removal rate also increases first and then decreases, but the magnitude of the change is smaller compared to the iron removal rate; when the passing rate through a 200-mesh sieve of solid particles in the neutralizer is 95%, the nickel precipitation rate increases significantly. Therefore, the best point of the two-stage iron-aluminum removal for calcium carbonate fineness is 90% in the passing rate through a 200-mesh sieve (at this time, the iron removal rate and aluminum removal rate are relatively high, and nickel precipitation rate, cobalt precipitation rate, and manganese precipitation rate are relatively low).

Therefore, it can be seen from a combination of Table 1 and Table 2 that selecting too coarse particles of the neutralizer may lead to insufficient reaction, thereby deteriorating the effect of iron-aluminum removal; while too fine particles may form local over-alkali resulting in excessive metal loss.

Specifically, the underlying causes of over-alkali are that the particles of the neutralizer react with the acid rapidly, and according to the existing physical and chemical theory, the rougher the particle surface, the easier the chemical reaction occurs.

Further, in order to ensure that the iron removal rate and the aluminum removal rate in the one-stage iron-aluminum removal treatment step and the two-stage iron-aluminum removal treatment step are relatively high, and the nickel precipitation rate, the cobalt precipitation rate, and the manganese precipitation rate are relatively low, the disclosure allows the passing rate through a 200-mesh sieve of the solid particles of the neutralizer to be in the range of 85 to 90%.

Furthermore, when the passing rate through a 200-mesh sieve of the solid particles of the neutralizer is lower than 85%, the iron removal rate and the aluminum removal rate when the neutralizer is applied to the one-stage iron-aluminum removal treatment step are relatively low, and the nickel precipitation rate, the cobalt precipitation rate, and the manganese precipitation rate are relatively high. Wherein, the solid particles of the neutralizer with a passing rate through a 200-mesh sieve lower than 85% react insufficiently with iron ions and aluminum ions in a solution, resulting in an excessively low iron removal rate and aluminum removal rate.

Furthermore, when the passing rate through a 200-mesh sieve of the solid particles of the neutralizer is greater than 90%, the iron removal rate and the aluminum removal rate when the neutralizer is applied to the two-stage iron-aluminum removal treatment step are relatively low, and the nickel precipitation rate, the cobalt precipitation rate, and the manganese precipitation rate are relatively high. Wherein, the solid particles of the neutralizer with a passing rate through a 200-mesh sieve of greater than 90% may form local over-alkali, resulting in an excessive metal loss rate.

Therefore, when the passing rate through a 200-mesh sieve of the solid particles of the neutralizer is in the range of 85% to 90%, the iron removal rate and the aluminum removal rate applied in the one-stage iron-aluminum removal treatment step and the two-stage iron-aluminum removal treatment step are relatively high, and the nickel precipitation rate, the cobalt precipitation rate, and the manganese precipitation rate are relatively low.

Now, the technical solution of the present application will be described in conjunction with specific examples.

Example 1

Firstly, a limonite-type laterite nickel ore with a nickel content of 2 wt. %, a ratio of acid to ore of 300 kg/t was leached at a leaching temperature of 250° C. A leached ore pulp was obtained after solid-liquid separation. Then, the leached ore pulp was subjected to cyclic leaching and pre-neutralization treatment by using a first neutralizer to obtain a pre-neutralized slurry, and the pH value at the endpoint was controlled to be 1.8. Wherein the first neutralizer used in the pre-neutralization treatment was limestone, which was prepared by merely grinding limestone ore using a vertical mill.

Then, the pre-neutralized slurry was subjected to countercurrent washing by using CCD washing, and solid-liquid separation to obtain a leaching tailing and a nickel-cobalt-manganese-containing feed liquid. The number of CCD washing stages is 4 and the washing ratio is 2.

Then, the pre-neutralized slurry was subjected to a one-stage iron-aluminum removal treatment by using a first neutralizer. A one-stage iron-aluminum-containing residue and a one-stage iron-aluminum removal liquid were obtained after solid-liquid separation. The pH value at the endpoint was controlled to be 4. The temperature of the one-stage iron-aluminum removal treatment was 60° C. Then, the one-stage iron-aluminum removal liquid was subjected to a two-stage iron-aluminum removal treatment by using the first neutralizer. A two-stage iron-aluminum-containing residue and a two-stage iron-aluminum removal liquid were obtained after solid-liquid separation. The pH value at the end-point was controlled to be 5, and the temperature of the two-stage iron-aluminum removal treatment was 60° C. Then, the two-stage iron-aluminum removal liquid was subjected to a deep impurity removal treatment and at least one stage of nickel-cobalt-manganese precipitation treatment. A nickel-cobalt-manganese hydroxide product was obtained after solid-liquid separation.

Specifically, the first neutralizer provided in this example 1 was obtained by grinding limestone ore through a vertical mill, wherein the calcium carbonate ore material after the vertical mill grinding treatment can have a passing rate through a 200-mesh sieve of 85% and a sphericity of 0.47; and the particle size distribution thereof was an unimodal distribution pattern.

Example 2

The differences from example 1 are that the pre-neutralized slurry was subjected to a one-stage iron-aluminum removal treatment by using a second neutralizer; a one-stage iron-aluminum-containing residue and a one-stage iron-aluminum removal liquid were obtained after solid-liquid separation; the pH value at the endpoint was controlled to be 4; and the temperature of the one-stage iron-aluminum removal treatment was 60° C.;

The difference from Example 1 is that a one-stage iron-aluminum removal liquid was subjected to a two-stage iron-aluminum removal treatment by using a second neutralizer; a two-stage iron-aluminum-containing residue and a two-stage iron-aluminum removal liquid were obtained after solid-liquid separation; the pH value at the endpoint was controlled to be 5; and the temperature of the two-stage iron-aluminum removal treatment was 60° C.;

Wherein the second neutralizer was prepared by grinding the limestone ore material in two stages and was respectively prepared by grinding the limestone ore using a vertical mill and a ball mill.

Specifically, the limestone ore was ground by a vertical mill firstly for the first time, so that the solid particles in the second neutralizer can have passing rate through a 200-mesh sieve of 75% (it can be seen from the data in Tables 1 and 2 that the iron removal rate and the aluminum removal rate in the one-stage iron-aluminum removal process and the two-stage iron-aluminum removal process were relatively high, and the nickel precipitation rate, the cobalt precipitation rate, and the manganese precipitation rate were relatively low).

Specifically, the solid particles of calcium carbonate with a passing rate through a 200-mesh sieve of 75% were ground for a second time using a ball mill so that the spherical coefficient of the solid particles in the second neutralizer was 0.62 (in this case, the surface roughness of the second neutralizer was low, so that the reaction of hydroxide generated by hydrolysis of the second neutralizer with nickel cobalt manganese ions became slow, thereby reducing metal loss), and the solid particles in the second neutralizer can have a passing rate through a 200-mesh sieve of 88%, and the particle size distribution thereof was in a bimodal distribution pattern.

Figure 2:
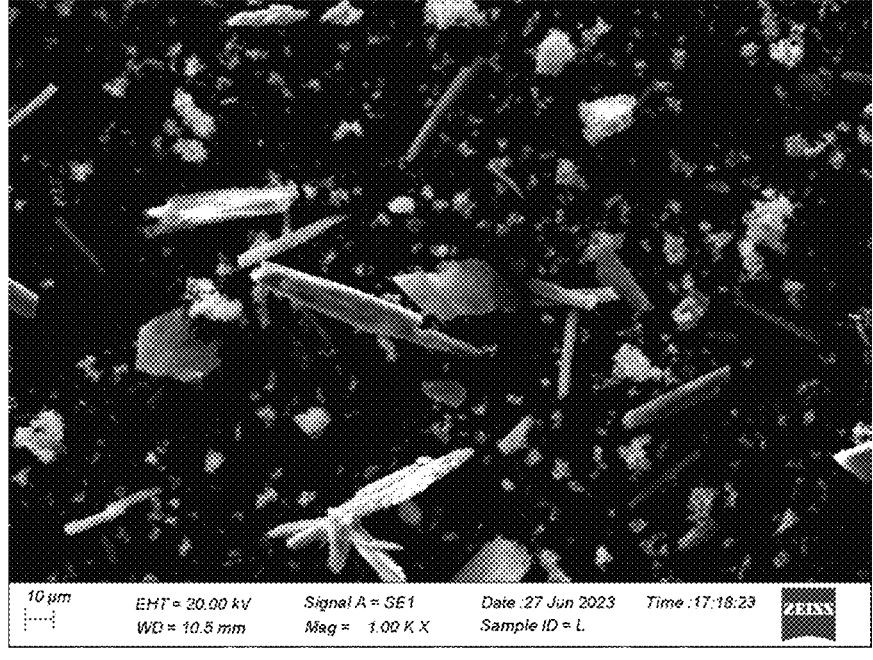
FIG. 2 is an electron microscopy schematic diagram of a first neutralizer in a method for improving the particle size and morphology of the neutralizer for laterite nickel ore hydrometallurgy in accordance with the disclosure.
Figure 3:
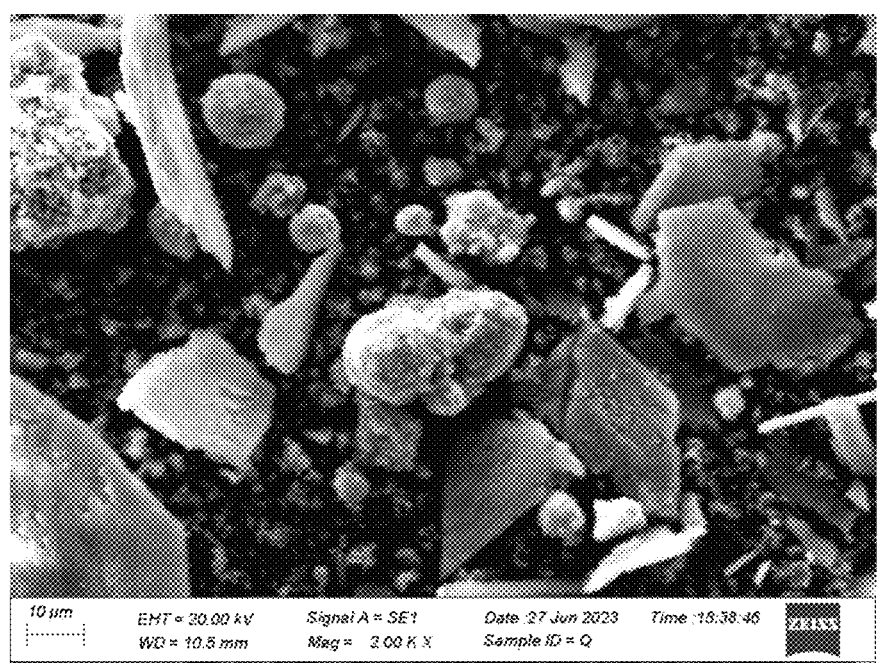
FIG. 3 is an electron microscopy schematic diagram of a second neutralizer in a method for improving the particle size and morphology of the neutralizer for laterite nickel ore hydrometallurgy in accordance with the disclosure.

With reference to FIGS. 2 and 3. FIG. 2 is an electron microscopy schematic diagram of the first neutralizer in a method for improving the particle size and morphology of the neutralizer for laterite nickel ore hydrometallurgy in accordance with the disclosure; and FIG. 3 is an electron microscopy schematic diagram of the second neutralizer in a method for improving the particle size and morphology of the neutralizer for laterite nickel ore hydrometallurgy in accordance with the disclosure.

Specifically, it can be seen from FIG. 2 that the particle prepared by the vertical mill has a greater roughness, more in the shape of an ellipsoid, a long rod, and a polyhedron. It can be seen from FIG. 3 that the particle surface roughness formed by ball milling and grinding is smaller and closer to a sphere. This is because there are multiple steel balls inside the ball mill, and during the rotation of the ball mill, adjacent steel balls are squeezed against each other, resulting in a lower surface roughness of solid particles and a closer spherical shape.

Specifically, the spherical coefficient of the powder prepared by the vertical mill ranges from 0.3 to 0.5, and the spherical coefficient of the powder prepared by the ball mill ranges from 0.45 to 0.7.

Figure 4:
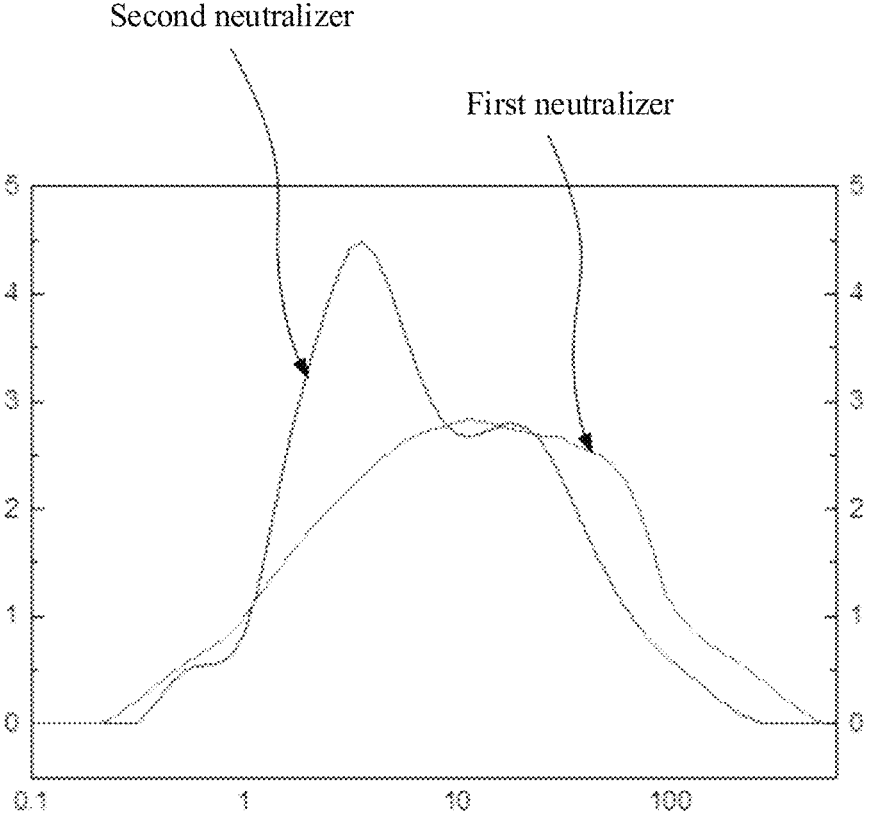
FIG. 4 is a schematic diagram of the particle size distribution plot of two different grinding methods provided by the disclosure, respectively.

Referring to FIG. 4. FIG. 4 is a schematic diagram of the particle size distribution plot of two different grinding methods provided by the disclosure, respectively. The abscissa is the particle size (in um), and the ordinate is the percentage of particle size density distribution (in %). The material of the neutralizer is calcium carbonate.

It can be seen from FIG. 4 that the particle size density distribution of the first neutralizer follows an unimodal distribution pattern (with only one particle size density distribution peak), and the particle size density distribution of the solid particles in the particle size range of 1 um to 100 um accounts for 0.5% to 2.5%; the particle size density distribution of the second neutralizer follows a bimodal distribution pattern (with two particle size density distribution peaks), and the particle size density distribution of the solid particles in the particle size range of 1 um to 10 um accounts for 2.5% to 4.5%, and the particle size density distribution of the solid particles in the particle size range of 10 um to 20 um accounts for 2.5% to 2.8%.

Specifically, in the particle size density distribution graph of the second neutralizer, there is one particle size density distribution peak in the particle size range of 1 um to 10 um and another particle size density distribution peak in the particle size range of 10 um to 20 um. Thus, the particle size distribution of the second neutralizer is more concentrated than the particle size distribution of the first neutralizer.

Specifically, the experimental results of the one-stage iron-aluminum removal treatment on the nickel-cobalt-manganese-containing feed liquid using the above-mentioned neutralizer with different particle sizes are shown in Table 3 below (experimental conditions: the neutralizer was selected from calcium carbonate, the temperature during the one-stage iron-aluminum removal process was 60° C., and the pH at the endpoint of the one-stage iron-aluminum removal liquid was 4):

TABLE 3

| Neutralizer | Iron removal rate % | Aluminum removal rate % | Nickel precipitation rate % | Cobalt precipitation rate % | Manganese precipitation rate % |
|---|---|---|---|---|---|
| 1 | 88.46 | 93.03 | 4.36 | 4.47 | 5.74 |
| 2 | 90.05 | 94.77 | 4.20 | 4.25 | 5.09 |

It can be seen from Table 3 that when the second neutralizer was used for the one-stage iron-aluminum removal treatment, the iron removal rate and aluminum removal rate were relatively higher, and the nickel precipitation rate, cobalt precipitation rate, and manganese precipitation rate were relatively lower than those of the first neutralizer.

Specifically, the experimental results of the two-stage iron-aluminum removal treatment on the one-stage iron-aluminum removal liquid using the above-mentioned neutralizer with different particle sizes are shown in Table 4 below: (experimental conditions: the neutralizer was selected from calcium carbonate; the temperature during the two-stage iron-aluminum removal process was 60° C.; and the pH value at the endpoint of the two-stage iron-aluminum removal liquid was 5)

TABLE 4

| Neutralizer | Iron removal rate % | Aluminum removal rate % | Nickel precipitation rate % | Cobalt precipitation rate % | Manganese precipitation rate % |
|---|---|---|---|---|---|
| 1 | 51.95 | 99.03 | 17.20 | 10.94 | 10.02 |
| 2 | 60.42 | 99.82 | 16.03 | 9.17 | 8.95 |

It can be seen from Table 4 that when the second neutralizer was used for the two-stage iron-aluminum removal treatment, the iron removal rate and aluminum removal rate were relatively higher, and the nickel precipitation rate, cobalt precipitation rate, and manganese precipitation rate were relatively lower than those of the first neutralizer.

The reason why the second neutralizer has a relatively higher iron removal rate and aluminum removal rate and a relatively lower nickel precipitation rate, cobalt precipitation rate, and manganese precipitation rate when performing the one-stage iron-aluminum removal treatment and the two-stage iron-aluminum removal treatment than the first neutralizer is mainly:

The second neutralizer was firstly ground by a vertical mill and then ground by a ball mill. The particle size density distribution was more concentrated, the surface morphology was better and the particle size was finer. On the one hand, the second neutralizer is solid particles with a relatively fine particle size, which is beneficial to improve the iron-aluminum removal rate when performing one-stage iron-aluminum removal treatment or two-stage iron-aluminum removal treatment; on the other hand, the solid particles with finer particle size have better fluidity in solution and are not easy to generate local over-alkali phenomenon. In addition, the spherical coefficient of the solid particles in the second neutralizer is higher, the surface of the solid particles is smoother, the fluidity is stronger, the dispersion in the solution is easier, and the chemical reaction with nickel-cobalt-manganese ions is not easy.

In summary, the neutralizer which is ground by the vertical mill and then ground by the ball mill has a more concentrated distribution of particle size density, a better surface morphology, and finer particle size than the neutralizer which is only ground by the vertical mill, so that the removal rates of iron and aluminum can be effectively improved and the metal loss caused by local over-alkali can be reduced.

Compared with the prior art, the disclosure provides a method for improving the particle size and morphology of a neutralizer used in the laterite nickel ore hydrometallurgy, in a process flow for producing nickel-cobalt-manganese hydroxide by the laterite nickel ore hydrometallurgy, a nickel-cobalt-manganese-containing feed liquid is subjected to the one-stage iron-aluminum removal treatment and two-stage iron-aluminum removal treatment by using a neutralizer successively, wherein the passing rate through a 200-mesh sieve of the neutralizer is 85%-90%, and the spherical coefficient of solid particles of the neutralizer is not less than 0.6. In the method for improving the particle size and morphology of a neutralizer used in the laterite nickel ore hydrometallurgy provided by the disclosure, the particle size and morphology of the neutralizer are respectively adjusted so as to be used in the steps of one-stage iron-aluminum removal treatment and two-stage iron-aluminum removal treatment sequentially. The passing rate through a 200-mesh sieve of the neutralizer is 85%-90%, ensuring relatively fine solid particles, thereby effectively increasing the iron-aluminum removal rates in the steps of one-stage iron-aluminum removal treatment and two-stage iron-aluminum removal treatment. At the same time, the spherical coefficient of solid particles of the neutralizer is not less than 0.6, ensuring a lower surface roughness of the solid particles of the neutralizer, thereby reducing the rates of nickel, cobalt, and manganese ions reacting with local alkali to generate precipitations, thereby reducing the loss of nickel, cobalt, and manganese and further improving the yield of nickel-cobalt-manganese hydroxide produced by the laterite nickel ore hydrometallurgy.

It should be noted that each of the above-mentioned examples belongs to the same inventive concept, and the description of each example has its own emphasis. Where the description of each example is not exhaustive, reference can be made to the description of other examples.

The foregoing examples merely present embodiments of the disclosure and are described in more detail and are not to be construed as limiting the scope of the disclosure. It should be noted that, for a person of ordinary skill in the art, a number of deformations and improvements can be made without departing from the conception of the disclosure, all of which fall within the scope of the disclosure. Therefore, the scope of the patent for the disclosure shall be governed by the appended claims.

What is claimed is:

1. A method for improving the particle size and morphology of a neutralizer for laterite nickel ore hydrometallurgy comprising, adjusting the particle size and morphology of the neutralizer by a grinding treatment, wherein the passing rate through a 200-mesh sieve of the neutralizer is 85%-90%, and the spherical coefficient of solid particles of the neutralizer is not less than 0.6; producing a nickel-cobalt-manganese hydroxide from a laterite nickel ore comprising, subjecting a nickel-cobalt-manganese containing liquid feed to a one-stage iron-aluminum removal treatment by using the neutralizer, and successively performing a two-stage iron-aluminum removal treatment by using the neutralizer.

2. The method for improving the particle size and morphology of the neutralizer for laterite nickel ore hydrometallurgy according to claim 1, characterized in that in the process flow for producing nickel-cobalt-manganese hydroxide by the laterite nickel ore hydrometallurgy, the nickel-cobalt-manganese-containing liquid feed is subjected to the one-stage iron-aluminum removal treatment by using the neutralizer, and a one-stage iron-aluminum-containing residue and a one-stage iron-aluminum removal liquid are obtained after solid-liquid separation; the one-stage iron-aluminum removal liquid is subjected to a two-stage iron-aluminum removal treatment by using the neutralizer, and a two-stage iron-aluminum-containing residue and a two-stage iron-aluminum removal liquid are obtained after solid-liquid separation.

3. The method for improving the particle size and morphology of the neutralizer for laterite nickel ore hydrometallurgy according to claim 2, characterized in that the material of the neutralizer is selected from at least one of limestone, lime milk, magnesite pulp, magnesia pulp, magnesium ore in laterite nickel ores, magnesium oxide, and sodium hydroxide.

4. The method for improving the particle size and morphology of the neutralizer for laterite nickel ore hydrometallurgy according to claim 1, characterized in that the neutralizer is prepared from a raw ore material by a one-stage grinding treatment and a two-stage grinding treatment, respectively, wherein the one-stage grinding treatment adopts a vertical mill to grind the raw ore material so as to obtain a first powder, and the two-stage grinding treatment adopts a ball mill to grind and shape the first powder so as to obtain a second powder;

wherein the spherical coefficient of the second powder is greater than the spherical coefficient of the first powder.

5. The method for improving the particle size and morphology of the neutralizer for laterite nickel ore hydrometallurgy according to claim 4, characterized in that the passing rate through a 200-mesh sieve of the raw ore material after the one-stage grinding treatment is 75% and the passing rate through a 200-mesh sieve of the raw ore material after the two-stage grinding treatment is 88%.

6. The method for improving the particle size and morphology of the neutralizer for laterite nickel ore hydrometallurgy according to claim 4, characterized in that the particle size density distribution pattern of the solid particles of the neutralizer is a bimodal distribution pattern; the particle size density distribution of the solid particles of the neutralizer in a particle size range of 1 um to 10 um accounts for 2.5% to 4.5%; and the particle size density distribution of the solid particles of the neutralizer in a particle size range of 10 um to 20 um accounts for 2.5% to 2.8%.

7. The method for improving the particle size and morphology of the neutralizer for laterite nickel ore hydrometallurgy according to claim 1, characterized in that the pH value of the one-stage iron-aluminum removal liquid is in a range of 3 to 4.2, and the pH value of the two-stage iron-aluminum removal liquid is in a range of 4.5 to 5.5.

8. The method for improving the particle size and morphology of the neutralizer for laterite nickel ore hydrometallurgy according to claim 1, characterized in that the iron removal rate in the one-stage iron-aluminum removal treatment process is greater than 88.46%; the aluminum removal rate in the one-stage iron-aluminum removal treatment process cess is greater than 93.03%; the nickel precipitation rate in the one-stage iron-aluminum removal treatment process is less than 4.36%, the cobalt precipitation rate in the one-stage iron-aluminum removal treatment process is less than 4.47%; and the manganese precipitation rate in the one-stage iron-aluminum removal treatment process is less than 5.74%.

9. The method for improving the particle size and morphology of the neutralizer for laterite nickel ore hydrometallurgy according to claim 2, characterized in that the iron removal rate in the two-stage iron-aluminum removal treatment process is greater than 51.95%; the aluminum removal rate in the two-stage iron-aluminum removal treatment process is greater than 99.03%; the nickel precipitation rate in the two-stage iron-aluminum removal treatment process is less than 17.20%, the cobalt precipitation rate in the two-stage iron-aluminum removal treatment process is less than 10.94%; and the manganese precipitation rate in the two-stage iron-aluminum removal treatment process is less than 10.20%.

10. The method for improving the particle size and morphology of the neutralizer for laterite nickel ore hydrometallurgy according to claim 1, characterized in that before the step of subjecting the nickel-cobalt-manganese-containing liquid feed to the one-stage iron-aluminum removal treatment step using the neutralizer, the method further comprises:

subjecting the laterite nickel ore to an acid-leaching treatment to obtain a leached ore pulp;

subjecting the leached ore pulp to cycle leaching and pre-neutralization treatment to obtain a pre-neutralized slurry; and subjecting the pre-neutralized slurry to counter-current washing, and solid-liquid separation to obtain a leaching tailing and the nickel-cobalt-manganese-containing liquid feed.

\* \* \* \* \*